(12) United States Patent
Lane et al.

(10) Patent No.: US 8,960,772 B2
(45) Date of Patent: Feb. 24, 2015

(54) HEAVY GOODS VEHICLES

(75) Inventors: Roger Michael Lane, Warwickshire (GB); Jonathan Alan Sayers, Warwickshire (GB); Mark Hopkins, West Midlands (GB); David Anthony Collins, Essex (GB); Paul Mark Bridden, Hertfordshire (GB)

(73) Assignee: Dennis Eagle Limited, Warwick (GB)

( * ) Notice: Subject to any disclaimer, the term of this patent is extended or adjusted under 35 U.S.C. 154(b) by 0 days.

(21) Appl. No.: 14/002,758

(22) PCT Filed: Mar. 2, 2012

(86) PCT No.: PCT/GB2012/000213
§ 371 (c)(1),
(2), (4) Date: Nov. 14, 2013

(87) PCT Pub. No.: WO2012/117225
PCT Pub. Date: Sep. 7, 2012

(65) Prior Publication Data
US 2014/0062143 A1    Mar. 6, 2014

(30) Foreign Application Priority Data
Mar. 3, 2011    (GB) .................................. 1103695.1

(51) Int. Cl.
*B62D 33/02*    (2006.01)
*B62D 21/10*    (2006.01)
*B60K 7/00*    (2006.01)
*B62D 33/04*    (2006.01)
*B65F 3/00*    (2006.01)

(52) U.S. Cl.
CPC ................ *B62D 21/10* (2013.01); *B62D 33/02* (2013.01); *B60K 7/0007* (2013.01); *B62D 33/04* (2013.01); *B65F 3/00* (2013.01)
USPC ...................................... 296/183.1; 296/184.1

(58) Field of Classification Search
CPC .......................... B65F 2003/006; B62D 33/02
USPC ............. 296/25, 183.1, 184.1, 183.2, 193.07, 296/204, 182.1; 280/790; 414/525.2
See application file for complete search history.

(56) References Cited

U.S. PATENT DOCUMENTS

| 3,002,782 A | 10/1961 | Jahn |
| 3,550,797 A | * 12/1970 | Nickel ........................... 414/812 |
| 3,771,675 A | * 11/1973 | Herpich et al. ................ 414/509 |
| 5,131,714 A | 7/1992 | Evans, Sr. et al. |

(Continued)

FOREIGN PATENT DOCUMENTS

| DE | 3116928 | 11/1982 |
| EP | 1353611 | 5/1974 |

(Continued)

OTHER PUBLICATIONS

International Search Report for PCT/GB/2012/000213, Issued Jul. 17, 2012.

*Primary Examiner* — Jason S Morrow
(74) *Attorney, Agent, or Firm* — Dority & Manning, P.A.

(57) ABSTRACT

A heavy goods vehicle has a dropped frame that includes an upper skin, a lower skin and lateral beams between the skins. The frame is self-supporting. In a vehicle independent real wheel motors are provided. The vehicle may be a diesel-electric hybrid. The dropped body is suitable for delivery and collection vehicles, and particularly refuse vehicles.

16 Claims, 4 Drawing Sheets

(56) References Cited

U.S. PATENT DOCUMENTS

| | | | |
|---|---|---|---|
| 5,417,453 A | 5/1995 | VanDenberg | |
| 5,931,628 A * | 8/1999 | Christenson | 414/408 |
| 6,354,616 B1 * | 3/2002 | Morin et al. | 280/124.147 |
| 6,793,035 B2 * | 9/2004 | Bennett et al. | 180/358 |
| 6,893,046 B2 * | 5/2005 | Ledesma et al. | 280/788 |
| 7,641,209 B2 * | 1/2010 | Watters | 280/124.109 |
| 7,712,823 B2 * | 5/2010 | Greuter et al. | 296/187.07 |
| 8,562,022 B2 * | 10/2013 | Nadeau et al. | 280/785 |
| 8,616,617 B2 * | 12/2013 | Sherbeck et al. | 296/187.07 |
| 2002/0182043 A1 * | 12/2002 | Anderson et al. | 414/469 |
| 2005/0179269 A1 * | 8/2005 | Weiland | 293/149 |
| 2010/0218667 A1 * | 9/2010 | Naroditsky et al. | 89/36.02 |
| 2011/0095574 A1 * | 4/2011 | Brown | 296/204 |

FOREIGN PATENT DOCUMENTS

| | | |
|---|---|---|
| EP | 0 677 425 A1 | 10/1995 |
| EP | 1 609 704 A2 | 12/2005 |
| EP | 1931182 | 6/2008 |
| WO | WO 2006/102714 A1 | 10/2006 |

* cited by examiner

HEAVY GOODS VEHICLES

The specification discloses inventions relating to heavy goods vehicles, and in particular to refuse trucks and the like.

A heavy goods vehicle (HGV) is distinguished from a light vehicle by the considerable difference between unladen and laden weight. The laden weight may be more than one and a half times the unladen weight. A HGV is identified in some legislation as exceeding 3500 kg when laden.

A typical HGV has a conventional 2 rail chassis to facilitate variation of load body, a diesel engine, an in line drive-train and rigid drive axle. The driver's cab is usually over the engine to permit a body of maximum size within legal limits of length, width and height. Maximizing load volume may be an important factor for relatively low density loads. Minimizing unladen weight may be important where the theoretical maximum load approaches a legislative limit. A conventional chassis, drive-train and rear drive axle can be a significant design constraint, especially where small increases in payload or volume can substantially improve the economics of vehicle operation over the life of a vehicle. In urban environments enhanced manoeuvrability is a strong design consideration, but is constrained by the convention of rigid drive axle and propeller shaft.

According to a first aspect of the present invention, there is provided a chassis frame of a heavy goods vehicle having a longitudinal axis, said frame comprising a bed having an upper skin, a lower skin and a plurality of lateral beams therebetween, wherein said bed has a continuous dropped centre on said axis.

Such an arrangement allows some of the space normally occupied by the drive line and rigid drive axle to be devoted to increased load volume, whilst also facilitating loading and unloading. The dropped bed extends longitudinally of the vehicle and may occupy substantially all of the available vehicle width between the vehicle rear wheels. The dropped bed may define the ground clearance of the vehicle, and may extend substantially below the rear wheel rotational axis. The dropped bed may define the rear wheel rotational axis, and in particular support the rear wheels for rotation thereon. The rear wheels are preferably provided with individual wheel motors to permit a conventional propeller shaft and differential gear to be eliminated. The wheel motors are preferably electric.

The dropped bed preferably comprises a straight sided trough having a substantially flat floor, the trough opening transversely above the wheels to a defined width, which may closely approach the maximum permissible vehicle width. A flat floor is desirable to maximize the available increase in load volume. The trough may slope downwardly to the rear, and may have a flared mouth behind the rear wheels of the vehicle. Ahead of the rear wheels the trough may have parallel sides, or may narrow towards the front. The sides of the trough, though straight, may be wider at the top than at the bottom.

In the preferred embodiment a standard air suspension is close coupled to the rear wheels so as to permit maximum trough width. The rear suspension may be defined by air chambers located fore and aft of the rear wheels at the side of the trough. Alternatively, the dropped bed may define the rear suspension mountings on the base of the trough, where adequate stiffness to resist suspension loads can be provided.

In one embodiment the upper skin comprises a continuous sheet. The lower skin may be continuous and/or provided in sections; the lower skin may be apertured. The lateral beams comprise stiffeners which are attached to the upper and lower skin to provide an integrated self-supporting structure. The arrangement provides a stiff sandwich-like construction.

In one embodiment the lateral beams extend substantially from one side of the dropped bed to the other, and are continuous. One piece beams are preferred. The lateral beams may protrude through the lower skin to provide attachment points for vehicle components and fittings. For example damper mounts may be provided in this way.

The lateral beams may be laterally straight, and of any suitable section, such as a planar web, a 'C' section or a 'Z' section. In one embodiment the dropped bed is a welded construction.

The lateral beams may include portions which are not perpendicular to the longitudinal axis. Such beams are thus kinked, joggled, or bent so that they will stand up without other support while being prepared for welding to an upper or a lower skin. A further advantage of this arrangement is that some added stiffness and anti-lozenging effect may be incorporated.

The dropped bed is preferably open at the sides between the top and bottom skins. A non-structural closing plate or plates may be provided along either side. The apertures between the skins and adjacent beams are thus accessible for storage and for housing vehicle equipment, for example electrical components, and for passage of electrical and/or fluid connections from one side of the vehicle to the other.

In comparison with a conventional vehicle chassis, the dropped bed of the invention is adapted for direct mounting of a body without the use of sub-frames or packer rails. The upper skin may typically comprise the floor of a vehicle body.

The lower skin may be apertured to provide clearance for vehicle components, in particular unsprung components which move relatively to the upper skin in use.

In a preferred embodiment the dropped bed is adapted for electric traction, one or more battery housings being provided on the underside of the trough, typically ahead of the rear wheel centreline. The or each housing is preferably box-like, and integrated with the dropped bed so as to contribute to the stiffness thereof whilst minimizing mass. Alternatively box-like battery housings may be provided on one or both sides of the trough.

In one embodiment the dropped bed is of welded steel construction, comprising a substantially unapertured upper skin having a thickness in the range 3-8 mm, a lower skin having a thickness in the range 2-5 mm, and lateral beams having a thickness in the range 2-10 mm. Typically 8-12 such beams may be required; placed closer together in the vicinity of suspension mountings. The upper and lower skins may have a nominal separation of 100-150 mm, and the separation may vary across the width of the bed. The dropped bed may be 200-800 mm deep, depending on vehicle ground clearance, wheel size and type of rear axle, if any.

The invention also provides a method of manufacture of a dropped bed according to the invention, and comprising placing the upper skin upside down, positioning the lateral beams and welding them to the upper skin, and placing the lower skin upside down on the beams and welding it in place through apertures therein.

The lateral beams may pass through first apertures of the lower skin, and thereby align the lower skin for welding to the beams through second apertures. In this way the lateral beams provide a location jig for the lower skin. The lower skin may be attached in parts and welded to provide an integrated surface.

In a preferred embodiment the dropped bed is for a refuse vehicle, and the trough may slope downwardly towards the rear (at a small angle (1-3°) for the purpose of aiding drainage and ejection of refuse. A refuse body may be constructed on the bed and comprise front and rear hoops. However the dropped bed is suitable for any kind of commercial vehicle body which may also be found on a conventional twin-rail chassis.

In order to provide clearance for front steering wheels, and for access to an internal combustion engine, the dropped bed may include forward facing legs attached to the front thereof by e.g. welding. The dropped bed however comprises substantially all of the carrying capacity of a vehicle to which it is fitted. The dropped bed may have an integral front bulkhead to which such rails may be attached.

Preferably the dropped bed of the invention accommodates limited rear wheel articulation for steering, in the range ±30°. Thus in the straight ahead condition the axes of rotation of the rear wheels are aligned, whereas for low speed manoeuvring, the rear wheels may be independently turned about a suitable respective trunnion or kingpin. If rear wheel steering is not required, the sides of the dropped bed may more closely approach the vehicle rear tyres.

In a vehicle, steering of the rear wheels may be determined independently of the front wheels by the vehicle driver, but preferably rear wheel steering is automatic, and dependent upon driver inputs to the steering wheel, and other control devices. Rear wheel steering is preferably inhibited above a pre-determined speed, for example 15 mph, so that the rear wheels are latched in a straight ahead configuration. The inhibiting speed, and the range of angle of permitted movement may be selectable. The rear wheels may adopt different angles of movement so as to minimize tyre scrub. Individual wheel motors may also permit torque vectoring or run at different speeds so as to permit cornering with a minimum of tyre scrub.

In an alternative aspect of the invention, there is provided a heavy goods vehicle having rear wheels on a substantially common rotational axis when in the straight-ahead condition, said rear wheels having independent wheel motors and being steerable, wherein said vehicle comprises a dropped bed between said wheels, the dropped centre extending longitudinally, being open to the rear and said wheels being suspended on said bed.

The dropped centre may not intercept the common rotational axis, so as to provide room for the mechanism which allows the rear wheels to steer, but nevertheless may contribute substantially to stiffness of the dropped centre body, and especially the base thereof. The dropped bed may overlap the vehicle tyres to a limited extent.

A heavy goods vehicle according to the invention is particularly suitable as a refuse vehicle, where maximum volume of vehicle body is desirable, along with straightforward discharge of the entire load to the rear.

The vehicle and dropped bed of the invention is particularly adapted to hybrid technology, in particular to a diesel-electric configuration having energy storage. Suitable control means may permit the engine to power the wheel motors directly and/or to supply energy to the energy storage device; and the control means may permit the energy storage device to power the wheel motors. The energy storage is typically in the form of one or more traction batteries.

Thus a vehicle according to a second aspect of the invention typically comprises an internal combustion engine, an electric generator, one or more traction batteries, and electric wheel motors. Torque vectoring of the wheel motors provides for increased manoeuvrability and reduction of tyre scrub.

A vehicle according to the invention can operate substantially silently when driven from the energy storage device, for example during early morning refuse collection in a densely populated area.

Electric traction batteries can be conveniently located on the underside or on one or both sides of the dropped bed, on the outside surface of the trough, and typically between the vehicle front and rear wheels. This location ensures a low centre of gravity for the vehicle, and gives excellent access for maintenance and replacement. The dropped bed preferably defines mountings for traction batteries. This preferred location also allows a traction battery to be located immediately adjacent to a respective wheel motor, thus minimizing power cable losses. The or each battery may be housed in an enclosure on the underside or at the sides of the dropped bed, and such enclosure(s) may substantially contribute to stiffness of the dropped bed assembly.

In a preferred embodiment each wheel motor is associated with a traction battery mounted immediately adjacent thereto, and preferably ahead of the respective wheel(s).

The wheel motors may be adapted to generate energy by providing a vehicle retardation effect. For example electric wheel motors may act as electric generators for the energy storage device.

Other features of the invention will be apparent from the following description of preferred embodiments shown by way of example only in the accompanying drawings, in which.

Figure 1:
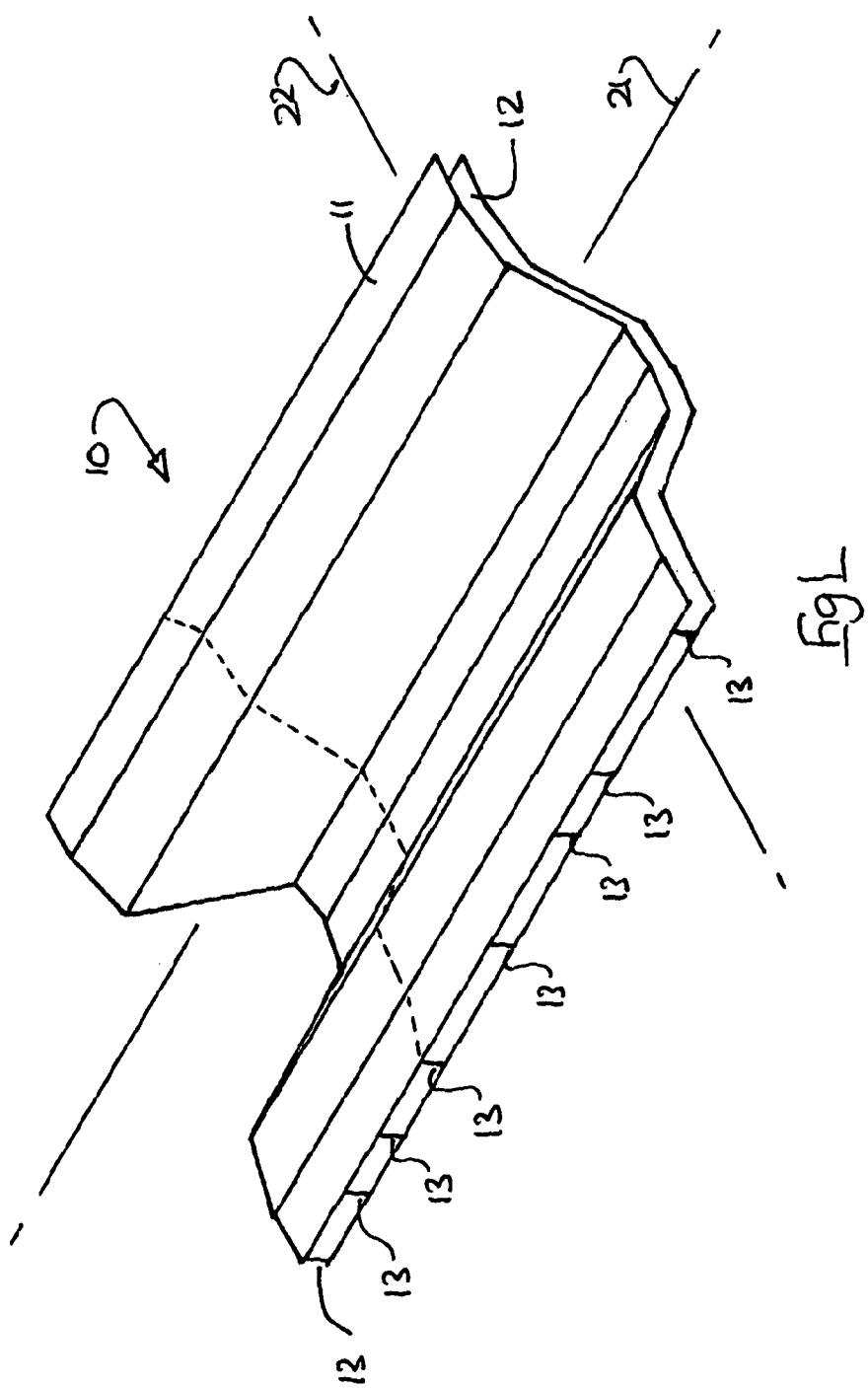
FIG. 1 illustrates a frame according to the invention in perspective from above.
Figure 2:
FIG. 2 illustrates a lateral beam of the frame, in plan.
Figure 3:
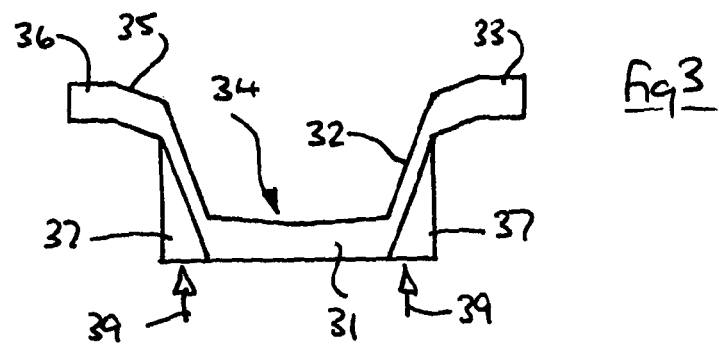
FIG. 3 illustrates a lateral beam of the frame, in elevation.

With reference to FIGS. 1-3, a chassis frame of a heavy goods vehicle comprises a bed 10 having an upper skin 11, a lower skin 12, and a plurality of lateral beams 13 between the skins and connected thereto. Typically the bed is a welded construction of steel, but could be of e.g. aluminium; other means of fixing the skins and beams is possible.

A vehicle centreline is represented by axis 21, and a rear wheel centreline by axis 22. The bed has a dropped centre in the direction of axis 21 so as to maximize volumetric capacity of a body constructed on the bed, as will be further explained below.

In the example of FIG. 1, eight lateral beams are illustrated but more or less can be provided according to the intended duty of the frame.

The upper skin 11 is preferably substantially unapertured, and is of sheet steel having a thickness in the range 3-8 mm. The lower skin 12 is also of sheet steel, but may contain apertures, and may further be comprised of several sections. The lower skin may have a thickness in the range 2-5 mm. The lateral beams 13 are of sheet steel having a thickness in the range 2-10 mm, and are substantially perpendicular to the upper and lower skins.

The beams 13 may have flanges at the upper and lower edges to facilitate welding to the skins, and such flanges may be continuous or discontinuous. The beams may be wholly or partly of 'C' or 'Z' section.

The normal spacing of the skins 11, 12 may be in the range 100-200 mm, and the bed 10 provides a self supporting chassis frame adapted to support a vehicle drive train, and a vehicle body.

FIG. 2 illustrates a sheet steel beam 13 in plan. The ends 14 of the beam are bent out of the lateral plane to allow the beam to stand on its upper or lower edge. Such an arrangement facilitates positioning of the beams 13 on the upper and lower skin for welding. Any port of the beam may lie out of the lateral plane for this purpose, and such non-lateral portions further stiffen the integrated chassis structure against lozenging.

A typical lateral beam is illustrated in FIG. 3. Dimensions are exaggerated in order to show the features thereof. A base portion 31 has outwardly angled upstanding limbs 32 which turn out to form free ends 33; the outward angle on the inside of the trough may be in the range 1-75° from the vertical, but is preferably in the range 20-60°, and most preferably in the range 45-55°. As additionally shown in FIG. 1, the upper side defines a shallow 'V' shaped channel 34 having an included angle of less than 10°, to facilitate drainage of the upper skin in use, the corresponding lower side is typically flat, and as wide as permitted by the vehicle wheels. The inner cheeks 35 slope downwardly for drainage, whereas the outer cheeks 36 are substantially horizontal. The channel 34 may also slope downwardly to the rear by a small angle—in the range 1-3°.

In the example of FIG. 3, planar triangular gussets 37 are welded to the outside edge of the limbs 32, or formed integrally therewith, so as to widen the base of the bed, for example to support a rear wheel suspension arrangement represented by arrows 39.

Figure 4:
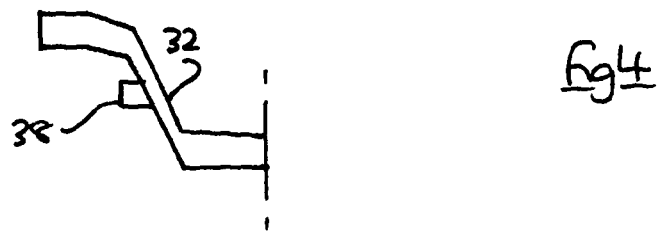
FIG. 4 illustrates one side of an alternative lateral beam, corresponding to FIG. 3.

FIG. 4 illustrates a half-section without such gussets, but including a lateral projection 38 approximately half way up the limb 32. The projection 38 may be of any suitable form, and in use projects through the lower skin to form a mounting for a chassis component, such as a damper. It is possible for such projections to be provided on each lateral beam 13, as a means of better supporting loads on the bed 10 or of transmitting loads into the bed.

Figure 5:
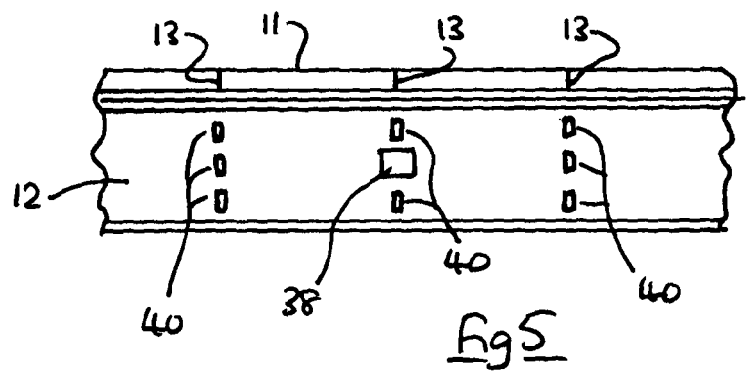
FIG. 5 illustrates a portion of the frame of FIG. 1 from the side.

The projections 38 also have the advantage of locating the lower skin 12, or lower skin portions for assembly. As illustrated in FIG. 5 such a projection 38 is box-like and locates a lower skin 12 both horizontally and vertically. A series of welding apertures 40 is provided in alignment with each lateral beam 13.

Thus in one method of manufacture, an upper skin 11 is inverted, and lateral beams 13 are placed thereon in the desired positions. These beams stand up by virtue of a joggle, such as illustrated in FIG. 2, and are welded into place. The upper skin is continuous and substantially unapertured.

The lower skin is then placed on the beams 13, possibly in sections, and located by projections 38. This location ensures that welding apertures 40 align with the edge of the lateral beams (or flanges thereof) to permit attachment of the lower skin. The finished assembly is then inverted for use, and the visible welds in the region of apertures 40 are substantially hidden from view.

Figure 6:
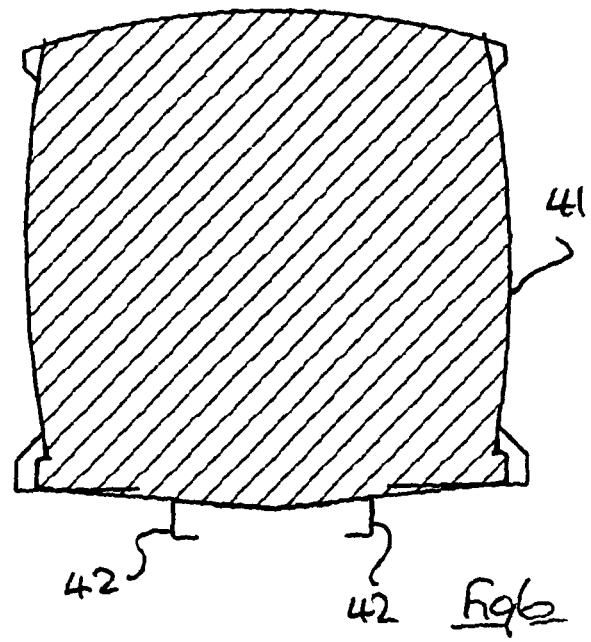
FIG. 6 illustrates the usable cross-sectional area of a conventional body/chassis of a refuse truck.
Figure 7:
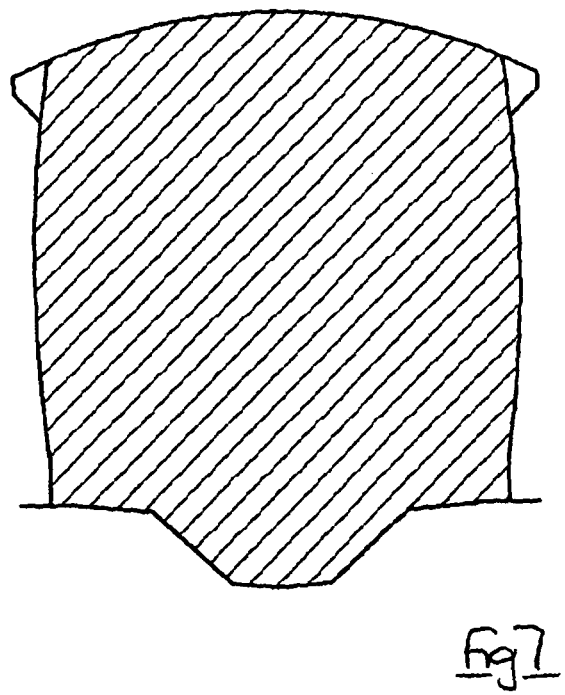
FIG. 7 illustrates the usable cross-sectional area of a refuse truck according to the invention, with integrated chassis frame.

FIG. 6 shows a volume cross-section of a conventional vehicle 41, such as a refuse vehicle, having 'C' section chassis rails 42 on which the body is constructed. Typically a conventional body may have a subframe or bearers between the chassis rails and body. FIG. 7 shows the same shape of body on the upper skin of a frame according to the invention. The dropped bed gives an increase in volume capacity in the range 5-10%.

The integrated chassis frame of the invention can be constructed with many variations of shape, and the thickness and quality of the constructional materials will be selected by the skilled man to provide a structure having the required strength and torsional stiffness. It will be clear however that the dropped bed substantially increases stiffness and strength in addition to providing a greater potential carrying volume.

Figure 8:
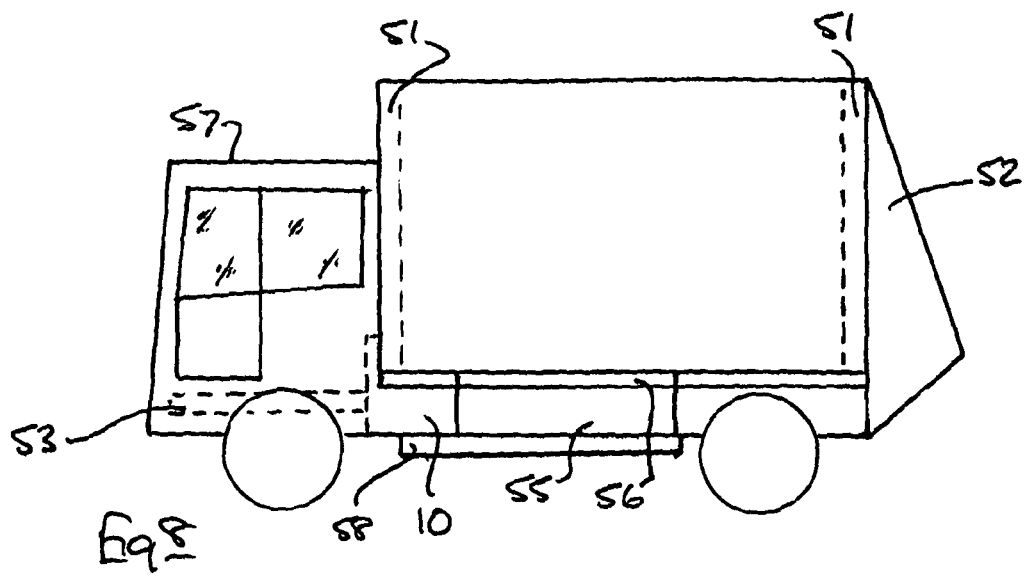
FIG. 8 illustrates a refuse vehicle incorporating a dropped bed chassis, in side elevation.

FIG. 8 illustrates a refuse vehicle constructed on a dropped chassis frame 10 according to the invention. Hoops 51 at the front and rear support an ejection ram (not shown) and a tailgate 52. Legs 53 protrude forwardly to support an internal combustion engine and transmission components, if provided. The legs provide space for the steering wheels to turn. A cab 57 is mounted on the legs 53.

Any suitable commercial vehicle body can be constructed on the chassis frame. The vehicle may be a hybrid, for example a series hybrid in which an internal combustion engine provides electrical power to a traction battery, which in turn powers electric rear wheel motors.

Figure 9:
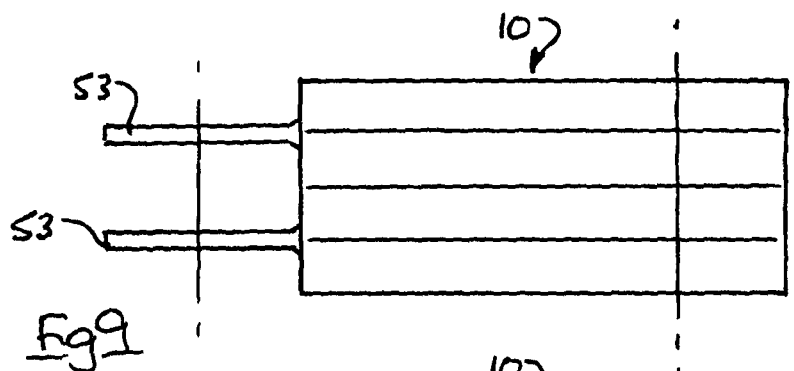
FIG. 9 illustrates the chassis of FIG. 8 in plan.
Figure 10:
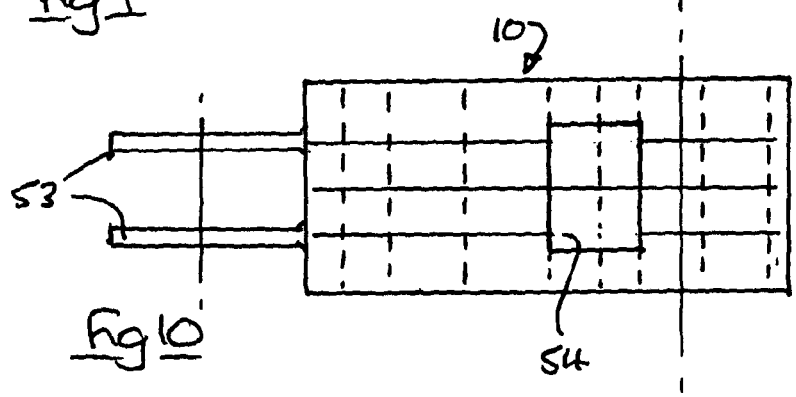
FIG. 10 illustrates the chassis of FIG. 8 from the underside.

The frame 10 and legs 53 are shown in plan in FIG. 9. FIG. 10 shows an underside view. The lateral beams 13 are shown in dotted line. A flat pad 54 provides support for suspension components of the rear axle, such as the chambers of an air suspension. The pad is wider than the base of the dropped bed, and the enlarged sides are supported by gussets of the kind illustrated in FIG. 3. This arrangement better provides for suspension loads to be supported by the dropped bed.

A traction battery may be mounted in an elongate compartment 58 on the underside of the trough ahead of the rear wheels, and rear suspension; the compartment is preferably integrated so as to contribute to the strength and stiffness of the dropped bed, and connected to one or more lateral beams.

In the alternative a locker 55 for a traction battery may be provided on one or both sides of the bed 10, ahead of the rear wheels. Such a locker may be of welded steel construction, may also contribute to stiffness of the dropped bed assembly, and be supported directly from lateral beams protruding through the lower skin.

The space 56 between the upper and lower skins is accessible from the sides, and may be used to house equipment or wiring in a protected environment. Suitable doors or other closures may be provided, as necessary.

The invention claimed is:

1. A chassis frame of a heavy goods vehicle having a longitudinal axis, said frame comprising a bed extending along the axis from a front of the frame to a back of the frame, the bed having an upper skin, a lower skin and a plurality of lateral beams therebetween, wherein each of the upper skin and the lower skin of said bed has a continuous dropped centre on said axis and defines a trough extending longitudinally in the direction of said axis.

2. A frame according to claim 1, wherein said dropped bed has a substantially flat floor.

3. A frame according to claim 1, wherein said upper skin is substantially unapertured.

4. A frame according to claim 1, wherein said lower skin is apertured.

5. A frame according to claim 4, wherein one or more of said beams protrudes through a corresponding aperture of said lower skin.

6. A frame according to claim 1, wherein a plurality of said beams are continuous from one side of said bed to the other.

7. A frame according to claim 1, and providing a suspension mounting on the base of said dropped centre.

8. A frame according to claim 1, wherein said dropped centre comprises a longitudinally symmetrical trough.

9. A frame according to claim 8, wherein said trough is wider at the top than at the bottom.

10. A frame according to claim 9, wherein said trough slopes downwardly to the rear.

11. A vehicle defining a longitudinal axis, the vehicle comprising:
- a frame, the frame including a bed extending along the axis from a front of the frame to a back of the frame, the bed having an upper skin, a lower skin and a plurality of lateral beams therebetween, wherein each of the upper skin and the lower skin of said bed has a continuous dropped centre on the longitudinal axis and defines a trough extending longitudinally in the direction of said axis; and
- wherein said upper skin supports substantially all of the load carrying capacity of the vehicle.

12. A vehicle according to claim 11, wherein said dropped centre includes a base and said frame supports rear wheel suspension on the base of the dropped centre.

13. A vehicle according to claim 11, further comprising:
- a rear wheel carried by the frame;
- a traction battery mounted to the underside of said dropped centre ahead of the rear wheel, and
- at least one electric wheel motor for driving the rear wheel; and
- wherein the vehicle is a hybrid.

14. A vehicle according to claim 11,
- wherein the vehicle is a refuse vehicle including a refuse body; and
- wherein said upper skin comprises the base of the refuse body.

15. A refuse vehicle defining a longitudinal axis, the refuse vehicle comprising:
- a frame; the frame including a bed having an upper skin, a lower skin and a plurality of lateral beams therebetween, wherein said bed has a continuous dropped centre on the longitudinal axis;
- a refuse body, wherein said upper skin comprises the base of the refuse body;
- wherein said upper skin supports substantially all of the load carrying capacity of the vehicle; and
- wherein said dropped bed supports upstanding hoops at the rear and front thereof to define said refuse body and support a tailgate mechanism at the rear of the dropped bed, and an ejection ram at the front of the dropped bed.

16. A vehicle according to claim 11, wherein the vehicle is a heavy goods vehicle.

* * * * *